US008131749B2

(12) United States Patent
Sayfan

(10) Patent No.: US 8,131,749 B2
(45) Date of Patent: Mar. 6, 2012

(54) DYNAMIC DATA HIERARCHIES

(75) Inventor: Giyora Sayfan, Davis, CA (US)

(73) Assignee: Sony Computer Entertainment Inc., Minato-Ku, Tokyo (JP)

( * ) Notice: Subject to any disclaimer, the term of this patent is extended or adjusted under 35 U.S.C. 154(b) by 179 days.

(21) Appl. No.: 11/623,021

(22) Filed: Jan. 12, 2007

(65) Prior Publication Data
US 2008/0201308 A1    Aug. 21, 2008

Related U.S. Application Data

(60) Provisional application No. 60/758,914, filed on Jan. 12, 2006.

(51) Int. Cl.
*G06F 7/00* (2006.01)

(52) U.S. Cl. ............ 707/769; 707/803; 707/966

(58) Field of Classification Search ............ None
See application file for complete search history.

(56) References Cited

U.S. PATENT DOCUMENTS

| | | | | |
|---|---|---|---|---|
| 5,280,575 A * | 1/1994 | Young et al. | ............ | 715/255 |
| 5,974,418 A * | 10/1999 | Blinn et al. | ............ | 707/100 |
| 6,523,046 B2 * | 2/2003 | Liu et al. | ............ | 707/104.1 |
| 6,782,394 B1 * | 8/2004 | Landeck et al. | ............ | 1/1 |
| 2001/0051948 A1 * | 12/2001 | Srinivasan et al. | ............ | 707/102 |
| 2004/0002993 A1 * | 1/2004 | Toussaint et al. | ............ | 707/104.1 |
| 2005/0097187 A1 * | 5/2005 | Thompson et al. | ............ | 709/217 |

FOREIGN PATENT DOCUMENTS

WO    WO 9956193 A2 *  11/1999

* cited by examiner

*Primary Examiner* — Tim T Vo
*Assistant Examiner* — Hasanul Mobin
(74) *Attorney, Agent, or Firm* — Kilpatrick Townsend & Stockton LLP

(57) ABSTRACT

A flexible database schema allows changes to the types of digital media objects, metadata types, and/or metadata relationships without corrupting the database, breaking applications functionality, or requiring the database reconstruction. A database schema stores all objects in a single table. The objects table contains common fields and generic metadata fields. The generic metadata fields reference metadata objects associated with a digital media object. Each type of digital media object can map its generic metadata fields to a different metadata hierarchy. A data access API provides a set of digital media object and metadata mappings to enable applications to insert and retrieve information from the database. The data access API can be updated as needed to account for changes in the metadata hierarchies of one or more types of digital media objects. The database schema can be used to store metadata for digital media objects or other types of data objects.

9 Claims, 3 Drawing Sheets

| KEY | TYPE | NAME | PATH | IMPORT DATE | MODIFY DATE | M1 | M2 | M3 | M4 |
|---|---|---|---|---|---|---|---|---|---|
| 2 | MUSIC=1234 | SONG1.MP3 | D:/MY_MUSIC/ | 12/07/2005 | 01/26/2006 | | | 38 | 22 |
| 7 | PHOTO=2345 | VACATION1.JPG | D:/MY_PHOTOS/ | 12/07/2005 | 01/26/2006 | | | | |
| 9 | MOVIE=3456 | CARTOON.MPEG | D:/MY_MOVIES/ | 12/07/2005 | 01/26/2006 | | | | |
| 22 | MUSIC_METvA = 5678 | ALBUM1 | | 12/07/2005 | | | | | |
| 38 | META_ARTIST | ARTIST1 | | | | | | | |
| 97 | MOVIE_META_RELEASE_YEAR | 1998 | | | | | | | |

| KEY | TYPE | NAME | PATH | IMPORT DATE | MODIFY DATE | M1 | M2 | M3 | M4 |
|---|---|---|---|---|---|---|---|---|---|
| 2 | MUSIC=1234 | SONG1.MP3 | D:/MY_MUSIC/ | 12/07/2005 | 01/26/2006 | | | 38 | 22 |
| 7 | PHOTO=2345 | VACATION1.JPG | D:/MY_PHOTOS/ | 12/07/2005 | 01/26/2006 | | | | |
| 9 | MOVIE=3456 | CARTOON.MPEG | D:/MY_MOVIES/ | 12/07/2005 | 01/26/2006 | | | | |
| 22 | MUSIC_META = 5678 | ALBUM1 | | 12/07/2005 | | | | | |
| 38 | META_ARTIST | ARTIST1 | | | | | | | |
| 97 | MOVIE_META_RELEASE YEAR | 1998 | | | | | | | |

FIG. 1

DYNAMIC DATA HIERARCHIES

CROSS-REFERENCES TO RELATED APPLICATIONS

This application is related to U.S. Provisional Patent Application No. 60/758,914, filed Jan. 12, 2006, which is incorporated by reference herein for all purposes.

BACKGROUND OF THE INVENTION

This invention relates to the field of digital media and metadata and database structures for searching, storing, organizing, and retrieving digital media and metadata. Digital media objects, such as music, images, movies, electronic documents, video games or data for use with video games, or other types data including audio, images, video, text, or other data, are often associated with metadata. Metadata may describe attributes of one or more digital media objects. For example, metadata for a digital music object can include the name of a song and its performer associated with the digital music file. Metadata may also describe relationships between two or more digital media objects. For example, the metadata for two or more digital music objects can indicate that the digital music objects are part of the same album. Metadata can be embedded within digital media or located outside of digital media.

The metadata associated with digital media objects can be used to define a hierarchy of digital media objects and metadata. For example, digital media objects can be categorized according to metadata by type, such as music, movies, and television shows. Within each category, additional metadata can specify attributes such as genres of music, movies, or television shows. Within a genre of music, metadata can define multiple artists, which in turn can include multiple albums, which in turn can further include multiple tracks.

Previously, metadata is typically modeled and store in a relational database management system (RDBMS) as a collection of tables, such as a categories table, a music genres table, a music artists table, a music albums table, and music tracks table. Foreign keys or other data attributes within each table link together metadata from each table. Metadata for digital media objects is retrieved using one or more database queries, often expressed in a query language such as SQL.

Typically, metadata stored in a RDBMS table contains foreign keys to all of the metadata hierarchy levels above it. For example, a row of the music tracks table would include foreign keys to the associated rows of metadata in the music category, the music genre, the music artist and the music album tables. In another typical arrangement, metadata stored in a RDBMS table contains only foreign keys to the metadata hierarchy level immediately above it. For example, a row of the music tracks table would include foreign keys to the associated rows of metadata in the music album table. A row of the music album table would include foreign keys to the associated rows of metadata in the music artist category.

Both of these prior arrangements of metadata require a complete specification of all types of digital media objects, all types of metadata, and all metadata relationships at the time the database is constructed. Changing or augmenting the types of digital media objects, the types of metadata, or the types of metadata relationships in any way can corrupt the database and break any applications that depend of the database.

Additionally, these prior arrangements of metadata in databases often require applications to perform database queries that have multiple join operations, which can be very time-consuming. Additionally, these database queries often result in the return of the full metadata information for digital media objects, which may be redundant in view of the desired database query.

It is therefore desirable that a system, method, and database schema allow metadata to be stored, retrieved, filtered, and sorted in an efficient manner. It is further desirable that the system, method and database schema be flexible to allow changes or augmentations of the types of digital media objects, the types of metadata, or the types of metadata relationships without corrupting the database, breaking the functionality of any applications that depend of the database, or requiring the database to be reconstructed.

BRIEF SUMMARY OF THE INVENTION

An embodiment of a database schema is flexible to allow changes or augmentations of the types of digital media objects, the types of metadata, or the types of metadata relationships without corrupting the database, breaking the functionality of any applications that depend of the database, or requiring the database to be reconstructed. A database schema stores all objects in a single objects table. The objects table contains common fields such as key, type, name, and path and generic metadata fields. The generic metadata fields reference metadata objects associated with a digital media object. Each type of digital media object can map its generic metadata fields to a different metadata hierarchy.

A data access API provides a set of digital media object and metadata mappings to enable applications to insert and retrieve information from the database. The data access API may also ensure that information in the database is coherent, as embodiments of the database schema can't enforce data integrity by itself. The data access API can be updated as needed to account for changes in the metadata hierarchies of one or more types of digital media objects. Because the information such as media objects, metadata objects and their relationships is stored in the database, it is possible to execute generic queries to get any interesting information without expensive joins. Filtering and sorting of result sets can be done generically without knowledge of the concrete type.

In an embodiment, arbitrary views (references to arbitrary collections of objects) and stored queries for dynamic views can be facilitated by the embodiments of the database schema and data access API. The database schema can be used to store metadata for digital media objects or other types of data objects.

BRIEF DESCRIPTION OF THE DRAWINGS

The invention will be described with reference to the drawings, in which:

FIG. 1 illustrates a data structure according to an embodiment of the invention;

DETAILED DESCRIPTION OF THE INVENTION

Figure 2:
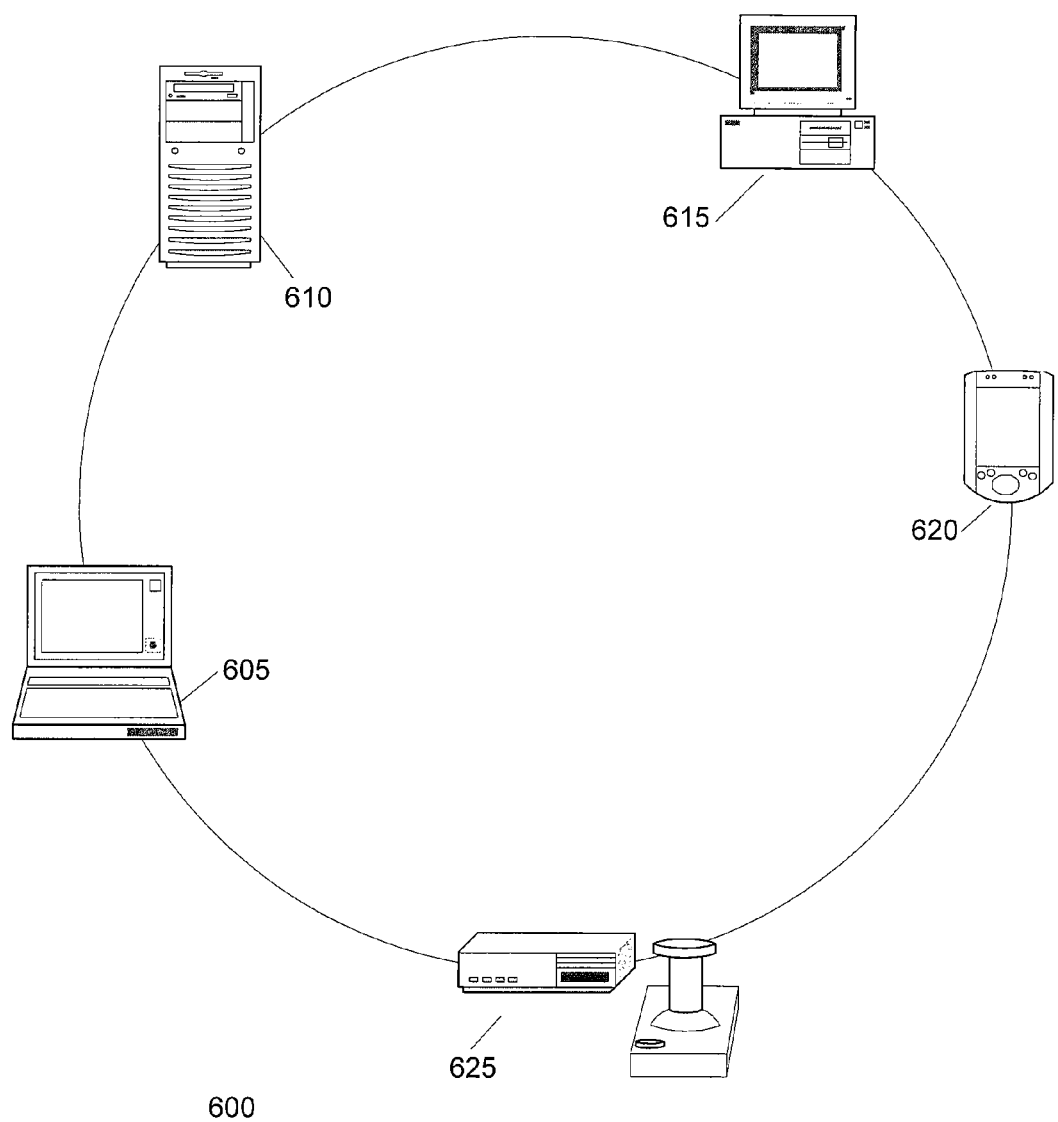
FIG. 2 illustrates a set of information processing devices suitable for use with an embodiment of the invention.

Embodiments of the invention includes a system, method, and database schema allowing metadata to be stored, retrieved, filtered, and sorted in an efficient manner. Embodiments of the invention also allow the system, method and database schema to be flexible to allow changes or augmentations of the types of digital media objects, the types of metadata, or the types of metadata relationships without corrupting the database, breaking the functionality of any applications that depend of the database, or requiring the database to be reconstructed. Embodiments of the invention can be used to store metadata for digital media objects or other types of data objects.

In an embodiment, a database schema stores all objects in a single objects table. The objects table contains common fields such as: key, type, name, path, import_date, modify_date etc. There are also a set of numeric metadata fields m_1, m_2, m_3, ... m_12. The number of generic metadata fields can be changed to meet the needs of different implementations. In an embodiment, the objects table stores both media objects, such as a music track 105, a photo 110, and a movie 115, and metadata objects, such as a music album 125, a music artist 130, or a movie release year 135. This arrangement is a deviation from common database design practices that prefer organizing entities with different attributes in separate tables, with each table's columns describe the attributes of its entities.

In some applications, digital media objects are organized hierarchically. For example, the Music category has multiple music genres, each genre has multiple artists, each artist has multiple albums and each album has multiple tracks. Previously, this type of example relationship was typically modeled in RDBMS as a collection of tables such as categories table, music genres table, music artists table, music albums table and music tracks table that are all linked through foreign keys. Applications can retrieve information such as all the music albums of a particular genre or all the tracks(songs) of a particular artist using database queries, typically expressed in database query languages such as SQL.

In contrast to prior database schemas, an embodiment of the invention is designed to facilitate rapid and numerous changes in metadata hierarchies. In this embodiment, the metadata hierarchy is encoded in the numeric generic metadata fields. The database schema contains no information about the relationships between different object types (e.g. a music artist has multiple music albums). This makes it easy to add a new metadata relationship, such as a music artist also having multiple live performances.

In an embodiment, once the information such as media objects, metadata objects and their relationships is stored in the database, it is possible to execute generic queries to get any interesting information without expensive joins. Filtering and sorting of result sets can be done generically without knowledge of the concrete type.

For example, assume that the type of music tracks is the number 1234 and that the database key for artist X is 5678. The music hierarchy for tracks may be encoded as follows:

m1—category
m2—music genre
m3—music artist
m4—music album

In this example, to get all the tracks of artist X ordered by album name, an application can initiate the following SQL query:

SELECT*FROM objects WHERE type=1234 AND
    m_3=5678 ORDER BY m_4;

As can be seen, this example query contains no meaningful information at the database levels. Thus, the query does not depend on a particular metadata hierarchy to function correctly.

For example, table entry 105 corresponding with a song has the metadata field entries m3=38 and m4=22. These values represent the key values for the artist and album metadata objects associated with the song of table entry 105.

In an embodiment, applications do not issue database queries directly. Instead, there is a mapping mechanism that translates between application-level knowledge (e.g. the type of music track) and the corresponding database representation (the number 1234).

In a further embodiment, a data access API provides a set of digital media object and metadata mappings to enable applications to insert and retrieve information from the database. In still a further embodiment, the data access API ensures that information in the database is coherent, as embodiments of the database schema can't enforce data integrity by itself. The data access API can be updated as needed to account for changes in the metadata hierarchy.

In an embodiment, arbitrary views (references to arbitrary collections of objects) and stored queries for dynamic views can be facilitated by the embodiments of the database schema and data access API.

Embodiments of the invention are further describe in the example script code cited below. This example script code creates and populates and example database according to embodiments of the invention.

Script for Creating the Database Schema:

```
"PRAGMA cache_size=500;"
"BEGIN TRANSACTION;",
"CREATE TABLE objects (key INTEGER PRIMARY KEY,"
    "type      NUMERIC,"
    "name      TEXT DEFAULT NULL,"
    "path      TEXT DEFAULT NULL,"
    "thumbnail TEXT DEFAULT NULL,"
    "file_size NUMERIC DEFAULT 0,"
    "file_format NUMERIC DEFAULT 0,"
    "import_date NUMERIC DEFAULT 0,"
    "modify_date NUMERIC DEFAULT 0,"
    "m_1 NUMERIC DEFAULT 0,"
    "m_2 NUMERIC DEFAULT 0,"
    "m_3 NUMERIC DEFAULT 0,"
    "m_4 NUMERIC DEFAULT 0,"
    "m_5 NUMERIC DEFAULT 0,"
    "m_6 NUMERIC DEFAULT 0,"
    "m_7 NUMERIC DEFAULT 0,"
    "m_8 NUMERIC DEFAULT 0,"
    "m_9 NUMERIC DEFAULT 0,"
    "m_10 NUMERIC DEFAULT 0,"
    "m_11 NUMERIC DEFAULT 0, "
    "m_12 NUMERIC DEFAULT 0);",
```

```
"CREATE INDEX objects_type_idx      ON objects(type);",
"CREATE INDEX objects_name_idx      ON objects(name);",
"CREATE INDEX objects_import_date_idx ON objects(import_date);",
"CREATE INDEX objects_modify_date_idx ON objects(modify_date);",
"CREATE INDEX objects_m_1_idx ON objects(m_1);",
"CREATE INDEX objects_m_2_idx ON objects(m_2);",
"CREATE INDEX objects_m_3_idx ON objects(m_3);",
"CREATE INDEX objects_m_4_idx ON objects(m_4);",
"CREATE INDEX objects_m_5_idx ON objects(m_5);",
"CREATE INDEX objects_m_6_idx ON objects(m_6);",
"CREATE INDEX objects_m_7_idx ON objects(m_7);",
"CREATE INDEX objects_m_8_idx ON objects(m_8);",
"CREATE INDEX objects_m_9_idx ON objects(m_9);",
"CREATE INDEX objects_m_10_idx ON objects(m_10);",
"CREATE INDEX objects_m_11_idx ON objects(m_11);",
"CREATE INDEX objects_m_12_idx ON objects(m_12);",
"CREATE TABLE views (view_key NUMERIC,"
        "item_key NUMERIC,"
        "ordering NUMERIC);",
"CREATE INDEX views_view_key_idx ON views(view_key);",
"CREATE INDEX views_item_key_idx ON views(item_key);",
"CREATE INDEX views_ordering_idx ON views(ordering);",
"COMMIT;",
```

Script for Populating a Sample Database:

```
"BEGIN TRANSACTION;",
//-- Categories
"INSERT INTO objects (key, type, name) VALUES(1, 11, 'Music');",
"INSERT INTO objects (key, type, name) VALUES(2, 11, 'Photos');",
"INSERT INTO objects (key, type, name) VALUES(3, 11, 'Movies');",
        //-- Types
        "INSERT INTO objects (key, type, name) VALUES(11, 0, 'Category');",
        "INSERT INTO objects (key, type, name) VALUES(12, 0,
'MusicGenre');",
        "INSERT INTO objects (key, type, name) VALUES(13, 0,
'MovieGenre');",
        "INSERT INTO objects (key, type, name) VALUES(14, 0, 'Artist');",
        "INSERT INTO objects (key, type, name) VALUES(15, 0,
'MusicAlbum');",
        "INSERT INTO objects (key, type, name) VALUES(16, 0,
'PhotoAlbum');",
        "INSERT INTO objects (key, type, name) VALUES(17, 0, 'Track');",
        "INSERT INTO objects (key, type, name) VALUES(18, 0, 'View');",
        "INSERT INTO objects (key, type, name) VALUES(19, 0, 'Photo');",
        "INSERT INTO objects (key, type, name) VALUES(20, 0, 'Movie');",
        "INSERT INTO objects (key, type, name) VALUES(21, 0,
'MovieActors');",
        "INSERT INTO objects (key, type, name) VALUES(22, 0,
'DynamicView');",
        //-- Views
        "INSERT INTO objects (key, type, name) VALUES(41, 18, 'Play List
1');",
        "INSERT INTO objects (key, type, name) VALUES(42, 18, 'Play List
2');",
        //-- Sub-Categories
        "INSERT INTO objects (key, type, name, m_1) VALUES(101, 12, 'Jazz',
1);",
        "INSERT INTO objects (key, type, name, m_1) VALUES(102, 12, 'Rap
and Hip Hop', 1);",
        "INSERT INTO objects (key, type, name, m_1) VALUES(103, 12,
'Classical Music', 1);",
        //-- Sub-Sub-Categories (1001-10000)
        "INSERT INTO objects (key, type, name, m_1, m_2) VALUES(1001, 14,
'Louis Armstrong', 1, 101);",
        "INSERT INTO objects (key, type, name, m_1, m_2) VALUES(1002, 14,
'OutKast', 1, 102);",
        "INSERT INTO objects (key, type, name, m_1, m_2) VALUES(1003, 14,
'50 Cent', 1, 102);",
        "INSERT INTO objects (key, type, name, m_1, m_2) VALUES(1004, 14,
'Nelly', 1, 102);",
        //-- Sub-Sub-Sub-Categories (10001-20000)
        "INSERT INTO objects (key, type, name, m_1, m_2, m_3) VALUES(10001,
15, 'ATLiens', 1, 102, 1002);",
        //-- Objects
        "INSERT INTO objects (key, type, name) VALUES(20001, -1, 'DUMMY
```

-continued

```
FIRST OBJECT');",
        "INSERT INTO objects (key, type, name, file_size, file_format, m_1,
m_2, m_3, m_4) VALUES(20002, 17, 'You May Die',  7777, 1, 1, 102, 1002,
10001);",
        "INSERT INTO objects (key, type, name, file_size, file_format, m_1,
m_2, m_3, m_4) VALUES(20003, 17, 'Two Dope Boys',  7777, 1, 1, 102, 1002,
10001);",
        "INSERT INTO objects (key, type, name, file_size, file_format, m_1,
m_2, m_3, m_4) VALUES(20004, 17, 'ATLiens',       7777, 1, 1, 102, 1002,
10001);",
        "INSERT INTO objects (key, type, name, file_size, file_format, m_1,
m_2, m_3, m_4) VALUES(20005, 17, 'Wheel Of Steel', 7777, 1, 1, 102, 1002,
10001);",
        "INSERT INTO objects (key, type, name, file_size, file_format, m_1,
m_2, m_3, m_4) VALUES(20006, 17, 'Jazzy Belle',   7777, 1, 1, 102, 1002,
10001);",
        "INSERT INTO objects (key, type, name, path, file_size,
file_format, m_1, m_2, m_3, m_4) VALUES(20007, 17, 'Elevators (Me & You)',
'dummy:path', 7777, 1, 1, 102, 1002, 10001);",
        // -- Dynamic Views
        "INSERT INTO objects (key, type, name, thumbnail, m_1, m_2)
VALUES(80001, 22, 'All Artists', 'SELECT * FROM objects WHERE m_1==1 AND
type==14', 1, 14);",
        "INSERT INTO objects (key, type, name, thumbnail, m_1, m_2)
VALUES(80002, 22, 'All Albums', 'SELECT * FROM objects WHERE m_1==1 AND
type==15', 1, 15);",
        "INSERT INTO objects (key, type, name, thumbnail, m_1, m_2)
VALUES(80003, 22, 'All Tracks', 'SELECT * FROM objects WHERE m_1==1 AND
type==17', 1, 17);",
        "INSERT INTO objects (key, type, name, thumbnail, m_1, m_2)
VALUES(80004, 22, 'All Albums', 'SELECT * FROM objects WHERE m_1==2 AND
type==16', 2, 16);",
        "INSERT INTO objects (key, type, name, thumbnail, m_1, m_2)
VALUES(80005, 22, 'All Photos', 'SELECT * FROM objects WHERE m_1==2 AND
type==19', 2, 19);",
        "INSERT INTO objects (key, type, name, thumbnail, m_1, m_2)
VALUES(80006, 22, 'All Genres', 'SELECT * FROM objects WHERE m_1==3 AND
type==13', 3, 13);",
        "INSERT INTO objects (key, type, name, thumbnail, m_1, m_2)
VALUES(80007, 22, 'All Movies', 'SELECT * FROM objects WHERE m_1==3 AND
type==20', 3, 20);",
        //-- Cleanup entire views table
        "DELETE FROM views;",
        //-- Play List 1
        "INSERT INTO views (view_key, item_key, ordering) VALUES(41, 20002,
2);",
        "INSERT INTO views (view_key, item_key, ordering) VALUES(41, 20003,
1);",
        "INSERT INTO views (view_key, item_key, ordering) VALUES(41, 20004,
0);",
        //-- Play List 2
        "INSERT INTO views (view_key, item_key, ordering) VALUES(42, 20005,
2);",
        "INSERT INTO views (view_key, item_key, ordering) VALUES(42, 20006,
0);",
        "INSERT INTO views (view_key, item_key, ordering) VALUES(42, 20007,
1);",
        "COMMIT;",
    };
```

FIG. 2 illustrates a set of information processing devices suitable for implementing an embodiment of the invention. A network 600 includes laptop or portable computers 605; server computers 610; desktop computers and workstations 615; mobile computing devices 620 such as mobile phones, personal digital assistants, portable digital media players, and portable or handheld game consoles; and home entertainment devices 625 such as video game consoles, digital media players, set-top boxes, media center computers and storage devices. Network 600 can include any number of each type of device independent of the number of devices of other types arranged according to any network topology. Network 600 can be implemented using any type of wired and/or wireless network connection, incorporating any type of electrical, optical, radio, or other communications means. The network 600 can encompass both local-area networks and wide-area networks, such as the Internet. Network 600 can be used to communicate digital media objects and associated metadata objects between devices.

Figure 3:
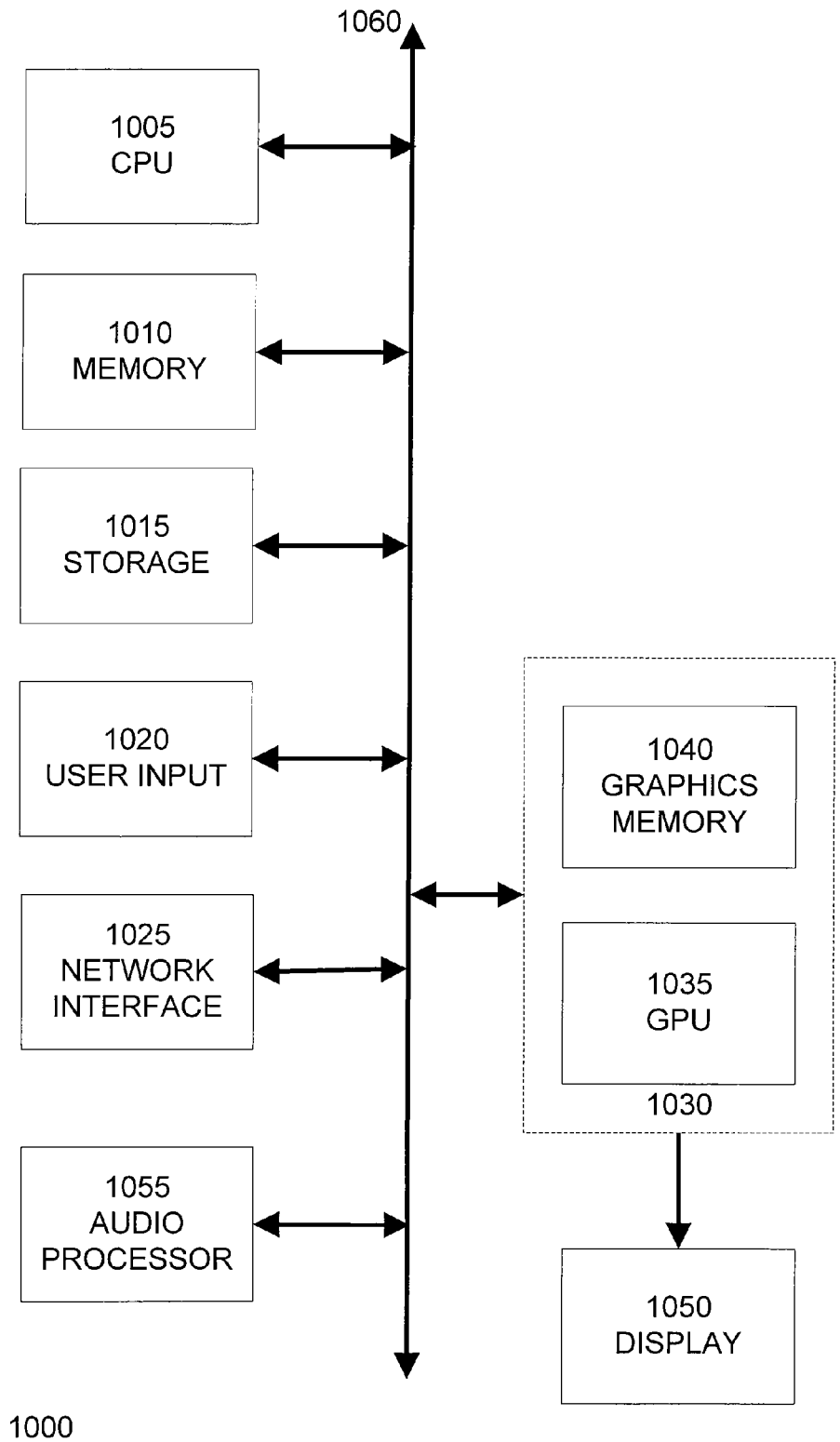
FIG. 3 illustrates a computer system suitable for implementing an embodiment of the invention.

FIG. 3 illustrates the components of an information processing device suitable for implementing a node of an overlay network according to an embodiment of the invention. FIG. 3 is a block diagram of a computer system 1000, such as a personal computer, video game console, personal digital assistant, or other digital device, suitable for practicing an embodiment of the invention. Computer system 1000 includes a central processing unit (CPU) 1005 for running software applications and optionally an operating system. CPU 1005 may be comprised of one or more processing cores. Memory 1010 stores applications and data for use by the CPU 1005. Storage 1015 provides non-volatile storage for applications and data and may include fixed disk drives, removable disk drives, flash memory devices, and CD-ROM, DVD-ROM, Blu-ray, HD-DVD, UMD, or other optical storage devices. Storage 1015 can organize and store digital media objects and metadata using a database as discussed above.

User input devices 1020 communicate user inputs from one or more users to the computer system 1000, examples of which may include keyboards, mice, joysticks, touch pads, touch screens, still or video cameras, and/or microphones. Network interface 1025 allows computer system 1000 to communicate with other computer systems via an electronic communications network, and may include wired or wireless communication over local area networks and wide area networks such as the Internet. An audio processor 1055 is adapted to generate analog or digital audio output from instructions and/or data provided by the CPU 1005, memory 1010, and/or storage 1015. The components of computer system 1000, including CPU 1005, memory 1010, data storage 1015, user input devices 1020, network interface 1025, and audio processor 1055 are connected via one or more data buses 1060.

A graphics subsystem 1030 is further connected with data bus 1060 and the components of the computer system 1000. The graphics subsystem 1030 includes a graphics processing unit (GPU) 1035 and graphics memory 1040. Graphics memory 1040 includes a display memory (e.g., a frame buffer) used for storing pixel data for each pixel of an output image. Graphics memory 1040 can be integrated in the same device as GPU 1035, connected as a separate device with GPU 1035, and/or implemented within memory 1010. Pixel data can be provided to graphics memory 1040 directly from the CPU 1005. Alternatively, CPU 1005 provides the GPU 1035 with data and/or instructions defining the desired output images, from which the GPU 1035 generates the pixel data of one or more output images. The data and/or instructions defining the desired output images can be stored in memory 1010 and/or graphics memory 1040. In an embodiment, the GPU 1035 includes 3D rendering capabilities for generating pixel data for output images from instructions and data defining the geometry, lighting, shading, texturing, motion, and/or camera parameters for a scene. The GPU 1035 can further include one or more programmable execution units capable of executing shader programs.

The graphics subsystem 1030 periodically outputs pixel data for an image from graphics memory 1040 to be displayed on display device 1050. Display device 1050 is any device capable of displaying visual information in response to a signal from the computer system 1000, including CRT, LCD, plasma, and OLED displays. Computer system 1000 can provide the display device 1050 with an analog or digital signal.

Further embodiments of these inventions can be envisioned to one of ordinary skill in the art after reading the attached documents. Embodiments of the invention can be used separately or together in any combination by portable or home video game consoles, portable or desktop personal computers, set-top boxes, audio or video consumer devices, personal digital assistants, mobile telephones, media servers, and personal audio and/or video players and recorders, and other types of electronic devices.

In other embodiments, combinations or sub-combinations of the above disclosed invention can be advantageously made. The specification is to be regarded in an illustrative rather than a restrictive sense. It will, however, be evident that various modifications and changes may be made thereunto without departing from the broader spirit and scope of the invention as set forth in the claims.

What is claimed is:

1. A computer system for storing metadata comprising:
   a processor;
   a memory operatively coupled to the processor;
   a database including a database schema, wherein the database schema includes a table with rows, each row having a generic metadata field and at least one numeric metadata field, wherein the generic metadata field is programmed to store data corresponding with any arbitrary type of metadata and the numeric metadata field is programmed to store data referencing another row of the table to establish a metadata categorization hierarchy between generic metadata stored in different rows in the same table; and
   a data access API in the memory programmed to translate, using the processor, a query for metadata of a specified type into a database query of the generic metadata field for data matching the metadata of the specified type.

2. The system of claim 1, wherein the data access API is configured to interface with an application providing the query for metadata of the specified type.

3. The system of claim 1, wherein the generic metadata field includes a field for numeric data.

4. The system of claim 1, wherein the database is programmed to store digital media objects associated with a metadata hierarchy.

5. A computer system for storing metadata comprising:
   a processor;
   a memory operatively connected to the processor;
   a database including a database table configured according to a database schema, wherein the database schema includes a generic metadata field and at least one numeric metadata field in each row of the database table, wherein the generic metadata field is programmed to store, using instructions in the memory executable by the processor, data corresponding with any arbitrary type of metadata and the numeric metadata field is programmed to store data corresponding to another row of the table to establish a metadata categorization hierarchy between generic metadata stored in different rows in the same table;
   a first database record of the database table configured for a first type of a digital media object, wherein a generic metadata field of the first database record includes a reference to a first metadata object having a first metadata type, and a numeric metadata field of the first database record references another database record; and
   a second database record of the database table configured for a second type of a digital media object, wherein a generic metadata field of the second database record includes a reference to a second metadata object having a second metadata type, and a numeric metadata field of the second database record references the first database record, thereby establishing a metadata hierarchy between database records.

6. The system of claim 5, further comprising:
   a third database record of the database table configured for the first metadata object, wherein the reference to the first metadata object in the first database record specifies the third database record; and
   a fourth database record of the database table configured for the second metadata object, wherein the reference to the second metadata object in the second database record specifies the fourth database record.

7. The system of claim 6, further including:

a data access API configured to translate a query for metadata of a specified type into a database system query of the generic metadata field for data matching the metadata of the specified type.

8. The system of claim 5, wherein the generic metadata field includes a field for numeric data.

9. A computer system for storing metadata comprising:

a processor;

a memory operatively coupled to the processor; and a database including a database schema, wherein the database schema includes an objects table with a numeric key field and a generic metadata field, wherein the generic metadata field is programmed to store data corresponding with any arbitrary type of metadata and the numeric key field is programmed to store data corresponding to a numeric key in a different row of the table to establish a metadata categorization hierarchy between generic metadata stored in different rows in the same table.

* * * * *